(12) United States Patent
Chung et al.

(10) Patent No.: US 8,184,066 B2
(45) Date of Patent: May 22, 2012

(54) COMPUTER SYSTEM AND CONTROL METHOD THEREOF

(75) Inventors: Won-seok Chung, Suwon-si (KR); Kwang-yong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1177 days.

(21) Appl. No.: 11/606,153

(22) Filed: Nov. 30, 2006

(65) Prior Publication Data

US 2007/0130371 A1    Jun. 7, 2007

(30) Foreign Application Priority Data

Dec. 2, 2005 (KR) .................... 10-2005-0116832

(51) Int. Cl.
*G09G 5/00* (2006.01)
(52) U.S. Cl. ............... 345/1.2; 345/204; 709/238
(58) Field of Classification Search ............ 345/1.1–3.1, 345/204; 709/201, 203, 208, 227, 230, 238; 715/733, 740; 380/270
See application file for complete search history.

(56) References Cited

U.S. PATENT DOCUMENTS

| 7,624,192 | B2 * | 11/2009 | Meyers et al. ............... 709/238 |
| 2003/0056098 | A1 | 3/2003 | Aihara |
| 2004/0155867 | A1 * | 8/2004 | Lin ............................... 345/168 |
| 2005/0120119 | A1 * | 6/2005 | Bhanu et al. .................. 709/229 |
| 2006/0284785 | A1 * | 12/2006 | Bitterlich ....................... 345/1.1 |

FOREIGN PATENT DOCUMENTS

| JP | 6-44158 | 2/1994 |
| JP | 2002-55764 | 2/2002 |
| JP | 2003-92784 | 3/2003 |
| KR | 20-0253716 | 10/2001 |
| WO | WO 2005/026943 | 3/2005 |

OTHER PUBLICATIONS

KaVoom, KaVoom KM brochure, www.kavoom.biz, published online Mar. 19, 2005.*
Neslo software, Desktop Rover, www.neslosoftware.com, published online Jul. 29, 2005.*
Synergy, Synergy Software, www.synergy2.sourceforge.net, published online Nov. 27, 2005.*
Office Action issued in Chinese Patent Application No. 2006101637807 on Dec. 21, 2007.

* cited by examiner

*Primary Examiner* — Amare Mengistu
*Assistant Examiner* — Dmitriy Bolotin
(74) *Attorney, Agent, or Firm* — Jefferson IP Law, LLP

(57) ABSTRACT

A computer system including a display unit to display a display area of the computer system, a wireless communications module to interface with at least one external device, a pointing processing unit to move a pointer indicated on the display unit in correspondence to a first radio signal input through the wireless communications module, and a controller which controls the wireless communications module to output a second radio signal, which corresponds to the first radio signal, to the external device when the pointer points to a changeover area of the display area of the display unit for a predetermined time.

35 Claims, 7 Drawing Sheets

COMPUTER SYSTEM AND CONTROL METHOD THEREOF

CROSS-REFERENCE TO RELATED APPLICATIONS

This application claims all the benefits accruing under 35 U.S.C. §119 from Korean Patent Application No. 2005-116832, filed on Dec. 2, 2005 in the Korean Intellectual Property Office, the disclosure of which is incorporated herein by reference.

BACKGROUND OF THE INVENTION

1. Field of the Invention

An aspect of the present invention relates to a computer system, and, more particularly, to a computer system which controls a plurality of components with a single external input device without repeatedly performing separation, recognition and installation of the external input device, and a control method thereof.

2. Description of the Related Art

Recently, as the technology of electronic devices has developed and user demands have diversified, a communication system, in which interconnected electronic devices having different functions, has been built. In such a communication system, various functions are implemented through data transmission and reception between the electronic devices.

Meanwhile, technologies, including a radio device or a similar low cost and low power link, have been developed in radio communications and computer industries. Such technologies, when applied to radio communications, provide a basis on which communications between devices may be based. Further, such technologies allow for a gradual emphasis on compactness and portability of office devices and on the removal of complicated connecting cables between office devices. For example, "Bluetooth" has been defined as a professional code by Ericsson AB and provides many of these advantages.

In a computer system supporting the Bluetooth communications, a Human Interface Device (HID) which is an external input device, such as a mouse and a keyboard, is used along with a computer in a one-to-one relationship. Referring to FIG. 1, a computer system 5A that supports the conventional Bluetooth communications will be described. A Human Interface Device (HID) 5 is placed near a computer 1 that a user desires to use. The Human Interface Device (HID) 5 is searched for in the computer 1 and the searched Human Interface Device (HID) 5 is selected in the computer 1. Then, an authentication process is performed by the use of a Personal Identity Number (PIN) code between the computer 1 and the Human Interface Device (HID) 5. Here, it is understood that connection interfaces 1a, 1b, 1c, and 1d between each of the computers 1, 2, 3, and 4 and the Human Interface Device (HID) 5 conform to Bluetooth communications.

Through the Bluetooth connection interface 1a that connects the computer 1 and the Human Interface Device (HID) 5 after a performance of a recognition/installation process, the computer 1 performs operations according to a radio signal that is input from the Human Interface Device (HID) 5. Here, in order to make communications between the computer 1 and the Human Interface Device (HID) 5 possible through the Bluetooth communications 1a, it is assumed that a Human Interface Device (HID) profile is included in Bluetooth modules (not shown) respectively provided in both the computer 1 and the Human Interface Device (HID) 5.

Here, where the user desires to control one of the other computers 2, 3 or 4 using the Human Interface Device (HID) 5, the computer 1 must be separated from the Human Interface Device (HID) 5. Then, in order to connect the Human Interface Device (HID) 5 to the one of the other computers 2, 3 or 4, the above-described search, selection, and authentication processes have to be performed again, this time between the Human Interface Device (HID) 5 and the one of the other computers 2, 3 or 4.

In the typical computer system, as described in connection with FIG. 1, the Human Interface Device (HID) 5 can be used with a plurality of computers 1, 2, 3, and 4. However, each time the Human Interface Device (HID) is connected to one of the computers, the above-described search, selection and authentication processes have to be repeated. That is, in order to change the connection of the Human Interface Device (HID) 5 from the computer in use to any of the other computers, the Human Interface Device (HID) 5 should be separated from the computer in use and then the above-described search, selection, and authentication processes have to be performed again between the Human Interface Device (HID) 5 and the one of the other computers 2, 3, and 4 to be used.

SUMMARY OF THE INVENTION

To solve the above and/or other problems, an aspect of the present invention provides a computer system and a control method thereof, which controls a plurality of devices with one external input device without the need to repetitively perform the processes of separating, recognizing, and installing the external input device.

The foregoing and/or other aspects of the present invention are achieved by providing a computer system including a display unit to display a display area of the computer system, a wireless communications module to interface with at least one external device, a pointing processing unit to move a pointer indicated on the display unit in correspondence to a first radio signal input through the wireless communications module, and a controller which controls the wireless communications module to output a second radio signal, which corresponds to the first radio signal, to the external device when the pointer points to a changeover area of the display area of the display unit for a predetermined time.

According to an example embodiment of the present invention, the display unit, the wireless communications module, the pointing processing unit and the controller are provided in a computer, and further comprising an external input device outputting the first radio signal according to an input of a user to the computer.

According to an example embodiment of the present invention, the controller grasps a display position of the pointer based on the process where the pointing processing unit moves the pointer.

According to an example embodiment of the present invention, the controller sets up at least one changeover area in the overall indication area of the display unit, and presets external device information on an external device corresponding to each changeover area.

According to an example embodiment of the present invention, the wireless communications module comprises a Bluetooth module having a Human Interface Device (HID) profile.

According to an example embodiment of the present invention, the controller controls the wireless communications module in order to convert data of the first radio signal into the second radio signal corresponding to the changeover area and being processed in the external device, and output the converted result to the external device, in the case that the pointer corresponding to the first radio signal is indicated on one changeover area over a predetermined time.

According to an example embodiment of the present invention, the wireless communications module converts data of the first radio signal to be processed in the external device corresponding to the changeover area using a Human Interface Device (HID) profile.

According to an example embodiment of the present invention, the computer system further comprises a first external device and at least one second external device, which interface with the computer through the wireless communications module, respectively, and wherein each external device comprises a display unit.

According to an example embodiment of the present invention, the controller presets a first changeover area corresponding to the first external device and a second changeover area corresponding to at least one second external device in the overall indication area of the display unit.

According to an example embodiment of the present invention, the first external device and the at least one second external device makes the pointer indicated on the display unit move according to the second radio signal in the case that the second radio signal is input by the interface through the wireless communications module from the computer, and provides the preset external device information corresponding to the changeover area in the case that the pointer is indicated on a predetermined changeover area of the display unit over a predetermined time.

According to an example embodiment of the present invention, the controller controls the wireless communications module in order to convert data of the first radio signal into the second radio signal which can be processed in the external device corresponding to the external device information and output the converted result, in the case that the external device information is input from one external device during outputting the second radio signal through the wireless communications module to any one of the first external device and the at least one second external device.

According to an example embodiment of the present invention, the controller determines whether or not the external device information input from any one external device of the first external device and the at least one second external device is information on the computer, and when the external device information is the information on the computer, controls the wireless communications module and the pointing processing unit in order to make the pointer indicated on the display unit of a computer move in correspondence to the first radio signal input through the wireless communications module.

The foregoing and/or other aspects of the present invention are also achieved by providing a control method of a computer system including a computer having an external input device and a wireless communications module to interface with at least one external device and the external input device, the control method comprising: causing the external input device to output a first radio signal; causing a pointer indicated on a display area of a display of the computer move in correspondence to the first radio signal; determining whether the pointer points to a changeover area, corresponding to the external device, on the display area for a predetermined time; and where the pointer points to the changeover area for the predetermined time, causing the computer to output a second radio signal corresponding to the first radio signal to the external device.

According to an example embodiment of the present invention, the control method further comprises the step of setting up at least one changeover area in the overall indication area to be displayed on the computer, and presetting the external device information on the external device corresponding to each changeover area.

According to an example embodiment of the present invention, the step of outputting the second radio signal corresponding to the first radio signal comprises the sub-steps of: converting data of the first radio signal into the second radio signal which can be processed in the preset external device in correspondence to the changeover area, in the case that the pointer indicated according to the first radio signal is indicated on one changeover area over a predetermined time; and outputting the converted result to the external device connected through the wireless communications module, in correspondence to the changeover area.

According to an example embodiment of the present invention, the control method further comprises a first external device and at least one second external device which are interfaced with the computer through the wireless communications module, and wherein each external device comprises a display unit.

According to an example embodiment of the present invention, the step of making the computer preset the external device information comprises a first changeover area corresponding to the first external device and a second changeover area corresponding to at least one second external device in the overall indication area to be displayed.

According to an example embodiment of the present invention, the first external device and the at least one second external device further perform the steps of: determining whether or not the second radio signal is input by the interface through the wireless communications module from the computer; making the pointer indicated on the display unit move according to the second radio signal in the case that it is determined that the second radio signal has been input to a corresponding external device; and providing the preset external device information corresponding to the changeover area to the computer, in the case that the pointer is indicated on the predetermined changeover area of the display unit over the predetermined time.

According to an example embodiment of the present invention, the computer performs the steps of determining whether or not the external device information is input during outputting the second radio signal to any one external device of the first external device and the at least one second external device through the wireless communications module; and converting data of the first radio signal into the second radio signal which can be processed in the external device corresponding to the external device information, in the case that the external device information is input.

According to an example embodiment of the present invention, the computer performs the step of making the pointer indicated on the computer move and displayed, in correspondence to the first radio signal input through the wireless communications module in the case that the input external device information is information on the computer.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
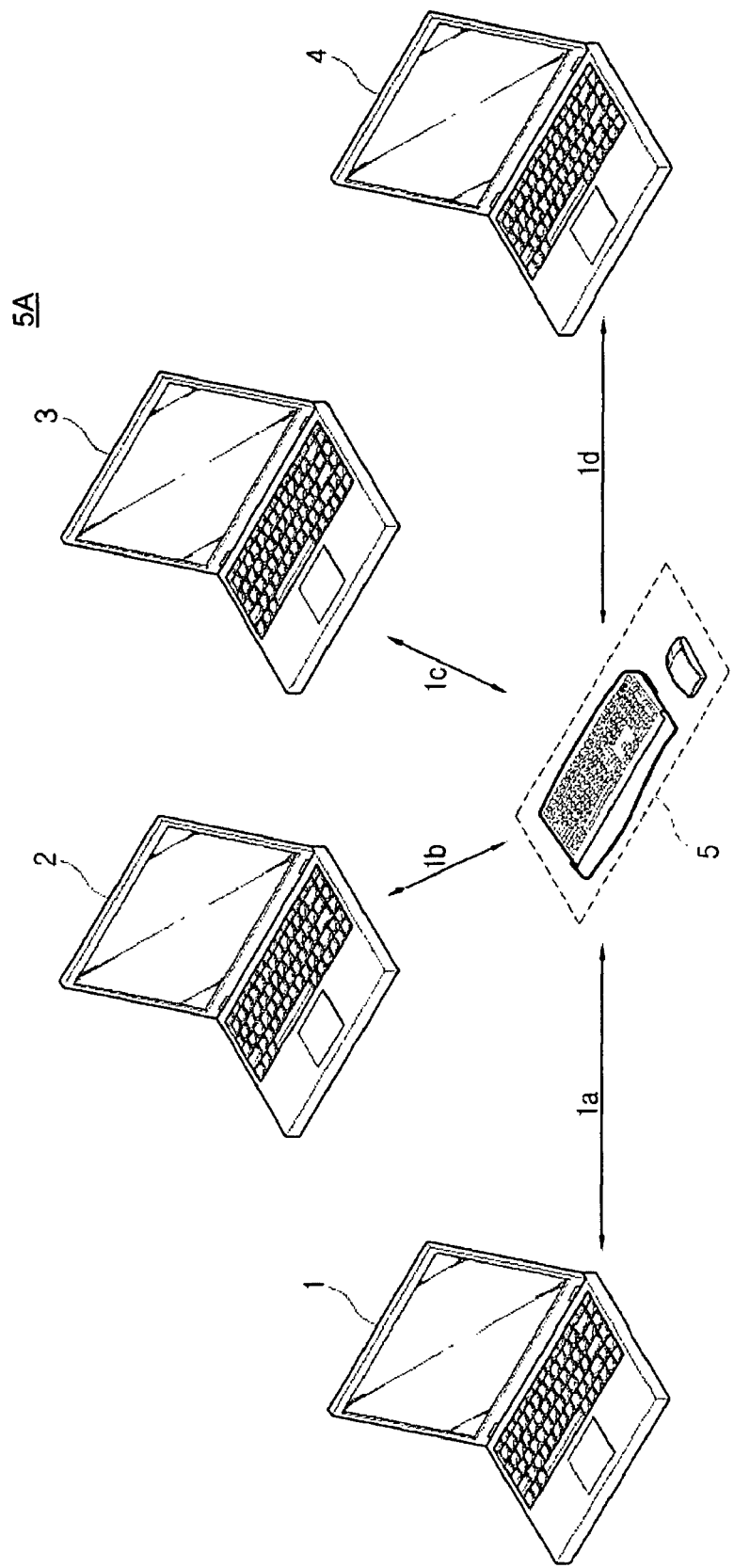
FIG. 1 illustrates a typical computer system that employs Bluetooth communications.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Herein below, a computer system and a control method thereof according to example embodiments of the present invention will be described with reference to FIGS. 2 through 7, respectively.

Figure 2:
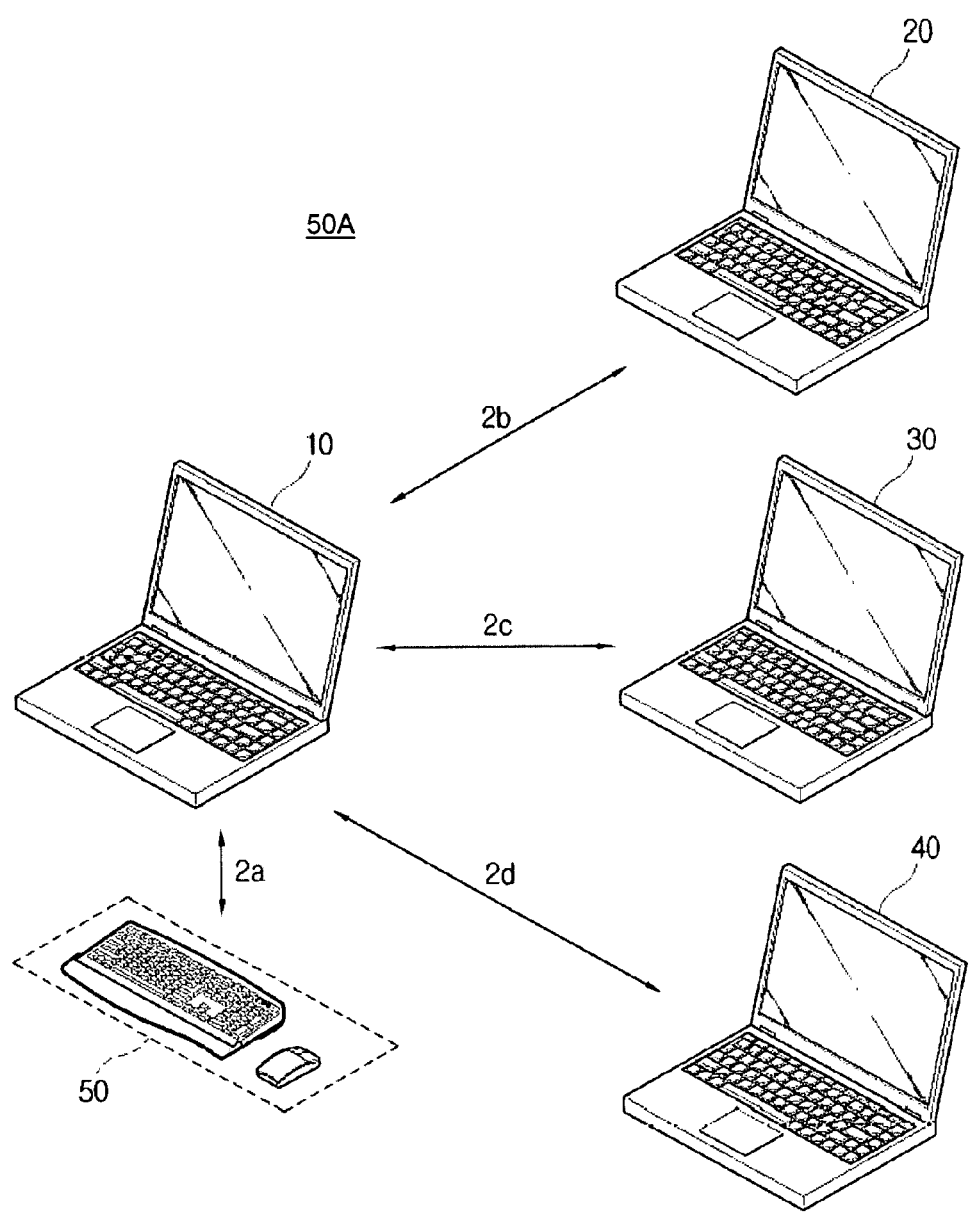
FIG. 2 illustrates a computer system that employs Bluetooth communications according to an example embodiment of the present invention.

FIG. 2 is a diagram showing an external appearance of a computer system according to aspects of the present invention. As shown in FIG. 2, the computer system 50A includes a Human Interface Device (HID) 50, a main device 10 connected with the HID 50 through Bluetooth communication 2a, and external devices 20, 30 and 40 connected with the main device 10 through Bluetooth communications 2b, 2c and 2d, respectively. For purposes of discussion, the main device 10 and external devices 20, 30 and 40 represent personal computers (PCs) such as laptop or desktop computers, so that the main device 10 may be called a main computer 10 or a host computer. However, the present invention is not limited thereto. These devices can be any electronic devices or mobile devices, such as personal digital assistants (PDAs) and mobile phones.

The HID 50 is an external input device supporting the Bluetooth communications 2a, 2b, 2c, and 2d and may be a mouse, a keyboard, a touch pad, etc. The HID 50 is connected to the main computer 10 through the Bluetooth communication 2a after undergoing the conventional recognition and installation processes. Also, the HID 50 outputs a first radio signal to the main computer according to a command of the user. Of course, it is understood that the HID 50 may also be connected to external devices 20, 30, and 40 through the conventional recognition and installation processes.

The main computer 10 is an electronic device supporting the Bluetooth communications and is connected with the HID 50 through the Bluetooth communication 2a. In addition, the main computer 10 is connected to the external devices 20, 30, and 40 through Bluetooth communications 2b, 2c, and 2d, respectively, after undergoing conventional recognition and installation processes.

The main computer 10 performs operations according to radio signals that are input from the HID 50. When a predetermined changeover event is input, the main computer 10 outputs a second radio signal to any one of the external devices 20, 30, and 40. According to an embodiment of the invention, the second radio signal corresponds to the first radio signal. However, it is understood that the invention does not require that the first and second radio signal directly correspond to each other and that other relationships, if any, may exist.

Each of the external devices 20, 30, and 40 is an electronic device that supports the Bluetooth communications 2a, 2b, 2c, and 2d. Further, as noted above, each external device 20, 30, and 40 is connected to the main computer 10 through Bluetooth communications 2b, 2c, and 2d, respectively. The external devices 20, 30, and 40 each may perform an operation according to the second radio signal input from the main computer 10, respectively.

Figure 3:
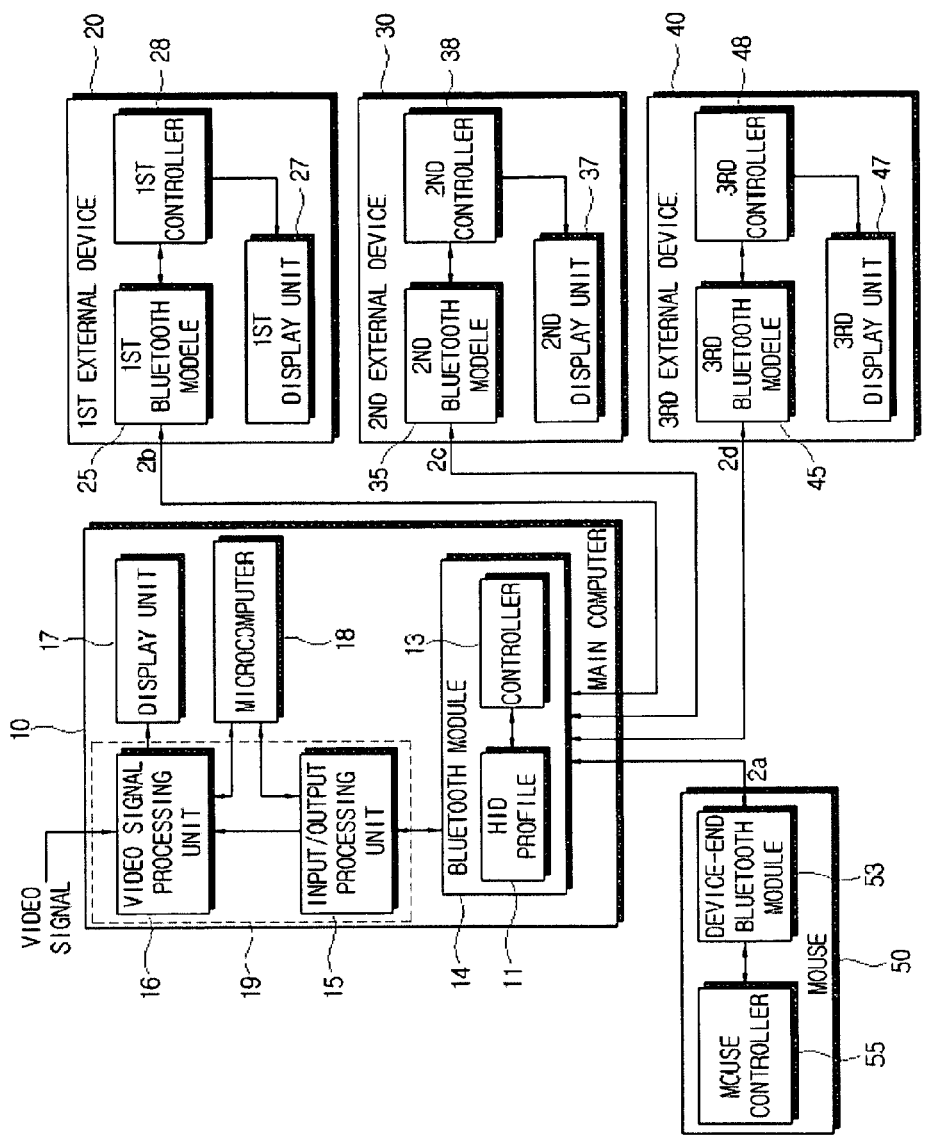
FIG. 3 is a block diagram of a computer system according to an example embodiment of the present invention.

Here, the present invention will be described with reference to FIG. 3, which is a block diagram of a computer system shown in FIG. 2.

The HID 50 is an external input device that outputs a first radio signal according to an input of a user, and may be a mouse, a keyboard, a touch pad, etc, or a combination thereof. Here, it will be assumed that the Human Interface Device (HID) 50 is a mouse.

The mouse 50 includes a device-end Bluetooth module 53 having an HID profile to output a first radio signal to the main computer 10 connected through the Bluetooth communication 2a. The mouse 50 further includes a mouse controller 55 to control the device-end Bluetooth module 53. The mouse controller 55, therefore, generates signals according to user manipulations of the mouse 50 and outputs the signals to the main computer 10.

The mouse 50 is connected to the main computer 10 through the Bluetooth communication 2a after undergoing the conventional recognition and installation processes when the mouse 50 is initially connected to the main computer 10. After the mouse 50 has been connected with the main computer 10, the mouse 50 is used to control the main computer 10. In that capacity, for example, the mouse 50 may cause a pointer on a display of the main computer 10 to move in accordance with user manipulations of the mouse 50. Similar the mouse 50 may cause the pointer of a display of one of the external devices 20, 30, and 40 to move in accordance with user manipulations of the mouse 50.

To this end, the main computer 10 includes a display unit 17 having a display area, a Bluetooth module 14, which is a wireless communications module to interface with the mouse 50, and at least one external device 20, 30, or 40. A pointing processing unit 19 makes the pointer displayed on the display unit 17 move in correspondence to a first radio signal input through the Bluetooth module 14. A microcomputer (MICOM) 18 controls the Bluetooth module 14 so that a second radio signal corresponding to the first radio signal is output to a preset external device 20, 30 or 40 which is connected through the Bluetooth module 14 in correspondence to a changeover area where a predetermined changeover event is input in which a pointer is indicated on a predetermined changeover area of the display unit 17 over a predetermined time.

The Bluetooth module 14 includes an HID profile 11 to process the first radio signal provided from the mouse 50 and to output the processed signal to the pointing processing unit

19. Alternately, the HID profile 11 converts the first radio signal into the second radio signal so as to provide the second radio signal to the external device. Although not illustrated in FIG. 3, the Bluetooth module 14 may include various kinds of profiles (e.g., a headset profile, to interface with various kinds of external devices, such as a head set connected through the Bluetooth communication 2*a*).

The Bluetooth module 14 includes a controller 13 to control the HID profile 11, which, as noted above, processes the first radio signal under the control of the MICOM 18 and outputs the processed result to the pointing processing unit 19. Alternately, the controller 13 converts the first radio signal into a second radio signal to be provided to the corresponding external device. Where an input from the mouse 50 is to be provided to any one of the external devices 20, 30, and 40, under the control of the MICOM 18, the controller 13 controls the HID profile 11 so that the first radio signal is converted into a form which the corresponding external device is able to recognize and process. The converted result is then provided to the corresponding external device.

For example, the controller 13 may control the HID profile 11 to maintain data information such as pointing information and click information of the first radio signal and, in order to output the second radio signal, to convert the destination address of the first radio signal into the address of the first external device 20 in the main computer 10. Here, since the main computer 10 and the first external device 20 have been already connected through the Bluetooth communication 2*b*, the controller 13 is able to control the Human Interface Device (HID) profile 11 such that the first radio signal is converted into the second radio signal to be provided for the first external device 20 using the address of the first external device 20 that is obtained from the recognition and installation processes that were completed the first external device 20 was initially connected with the main computer 10.

The pointing processing unit 19 causes the pointer displayed on the display unit 17 to move in correspondence to the first radio signal input through the Bluetooth module 14. The pointing processing unit 19 includes a video signal processing unit 16 and an input/output processing unit 15. The video signal processing unit 16 processes an input video signal. The input/output processing unit 15 processes and outputs a first signal according to the first radio signal processed at the Bluetooth module 14 so as to be processed in the video signal processing unit 16 and the MICOM 18.

Thus, when the first radio signal output from the mouse 50 is processed at the Bluetooth module 14 and is input to the input/output processing unit 16, the first signal is provided to the MICOM 18 and the video signal processing unit 16 and the pointer is moved on the screen of the display unit 17. Further, operations, which activate a menu screen or which otherwise change the screen, are then performed.

The MICOM 18 performs the conventional recognition and installation processes to initially connect the mouse 50 with the main computer 10, and controls the connection between the Bluetooth module 14 and the mouse 50, through the Bluetooth communication 2*a*. Moreover, the MICOM 18 performs the conventional recognition and installation processes to initially connect external devices 20, 30, and 40 with the main computer 10 and controls the connection between the Bluetooth module 14 and the external devices 20, 30, and 40 through Bluetooth communications 2*b*, 2*c*, and 2*d*, respectively. Here, according to example embodiments of the invention, the microcomputer (MICOM) 18 memorizes a type of the mouse 50 and types of the external devices 20, 30 and 40 as well as the addresses thereof.

After completing the initial recognition and installation processes, the MICOM 18 controls the Bluetooth module 14 and so controls radio communications between the Bluetooth module 14 and the mouse 50 and the external devices 20, 30, and 40. That is, the MICOM 18 processes the first radio signal input from the mouse 50. Further, the MICOM 18 controls the Bluetooth module 14, the input/output processing unit 15 and the video signal processing unit 16, to perform pointer movements and menu displays according to the processed first radio signal. Here, according to the first radio signal, the MICOM 18 may grasp a display position of a pointer indicated on the display unit 17. That is, the MICOM 18 obtains the display position information of the pointer according to the first radio signal from any one of the input/output processing unit 15 and the video signal processing unit 16.

In the meantime, the MICOM 18 sets up one or more changeover areas on the overall indication area of the display unit 17, and presets external device information on the external devices 20, 30, and 40 to correspond to each changeover area when connected through the Bluetooth communications 2*b*, 2*c*, and 2*d*, respectively. Thus, the MICOM 18 determines whether a predetermined changeover event, in which a pointer points to a predetermined changeover area of the display unit 17 for a predetermined time, occurs.

Here, referring to FIG. 4, a control of the MICOM 18 will be described in order to illustrate this changeover event input on a display unit 17.

Figure 4:
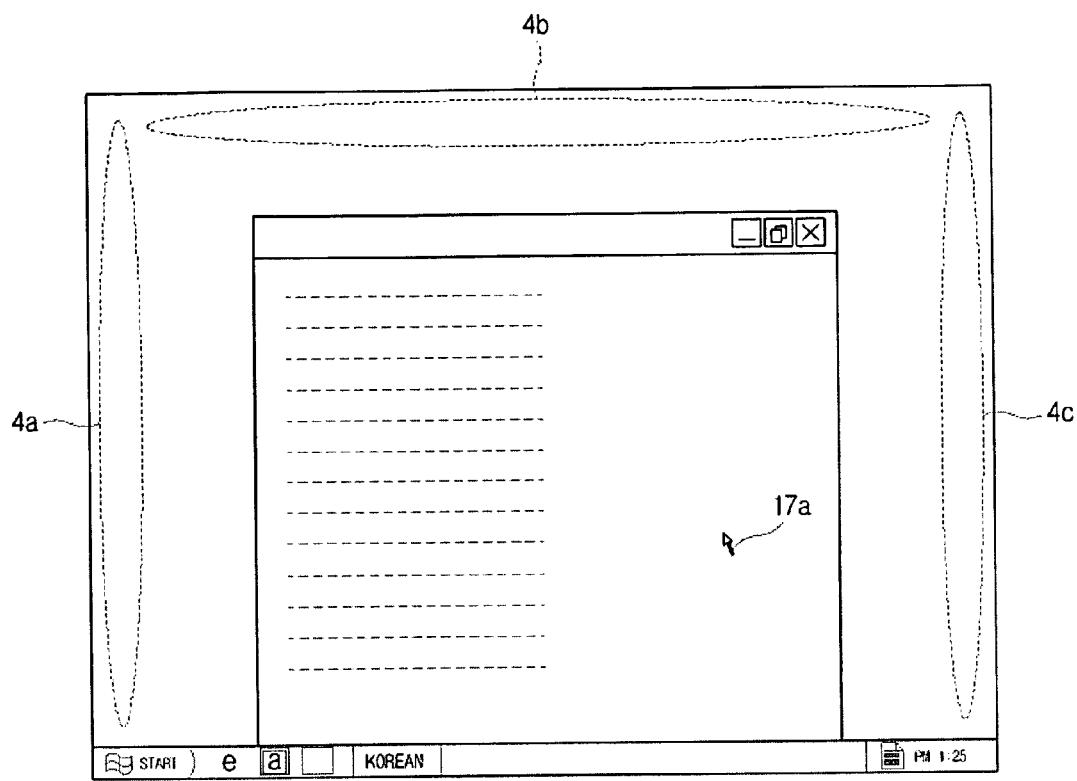
FIG. 4 illustrates respective conversion areas which are preset on a screen of a display unit.

As shown in FIG. 4, the MICOM 18 presets a first changeover area 4*a*, a second changeover area 4*b* and a third changeover area 4*c* in the overall indication area of the display unit 17 to correspond to the first, second, and third external devices 20, 30, and 40. Also, under the control of the MICOM 18, the pointer 17*a* is indicated on the screen of the display unit 17 according to the first radio signal. Here, the MICOM 18 determines whether the pointer 17*a* is indicated on any one of the changeover areas 4*a*, 4*b*, and 4*c* for a predetermined time (e.g., five seconds).

For example, where the MICOM 18 determines that the pointer 17*a* is indicated on the first changeover area 4*a* over the predetermined time, the MICOM 18 controls the controller 13 of the Bluetooth module 14 to convert the first radio signal input from the mouse 50 into the second radio signal to be provided to the first external device 20. Thus, the Bluetooth module 14 converts the first radio signal into the second radio signal which is recognized and processed in the first external device 20, using the HID profile 11. Here, three changeover areas are set up in FIG. 4. However, this is only an example embodiment, as the changeover area can be set up in various forms and may be a single area, a dual area, an area with three sub-areas, or an area with more than three sub-areas.

Accordingly, where the main computer 10 receives an input corresponding to a changeover event, the main computer 10 converts the first radio signal input from the mouse 50 through the Bluetooth communications 2*a* into the second radio signal to be provided to the corresponding external device. In this way, the main computer 10 performs the same function as that of the mouse 50 by outputting the first radio signal input from the mouse 50 to the corresponding external device.

The first external device 20 is connected with the main computer 10, having undergone the initial recognition and installation processes through the Bluetooth communications 2*b*. This first external device 20 includes a first display unit 27, a Bluetooth module 25, which is a wireless communications module that interfaces with an external device, and a first controller 28 to communicate with the external device connected through the first Bluetooth module 25. Of course, the first Bluetooth module 25 includes an HID profile.

The first external device 20 performs operations in which a pointer is moved, a menu screen is indicated, or a screen is changed over on the screen of the first display unit 27 according to the second radio signal, where the second radio signal is input from the main computer 10 through the Bluetooth communication 2b. That is, the first controller 28 controls the first Bluetooth module 25 to process the second radio signal to be used in the first external device 20, when the second radio signal is input from the main computer 10, and performs a control action such as pointer movement and a menu display according to the second signal corresponding to the second radio signal processed at the first Bluetooth module 25. According to an example embodiment of the invention, the controller 28 includes a first pointing processing unit (not shown) of the similar or the same configuration as that of the pointing processing unit 19 in the main computer 10.

Here, as an example, according to the second radio signal, the first controller 28 grasps a display position of a pointer indicated on the first display unit 27.

In the meantime, the first controller 28 sets up at least one changeover area on the overall indication area of the first display unit 27, and sets up external device information for the main computer 10 and the external devices 30 and 40 in advance. Thus, the first controller 28 determines whether the pointer points to a predetermined changeover area of the first display unit 27 over a predetermined time. When it is determined that the pointer points to the predetermined changeover area of the first display unit 27 over the predetermined time, the first controller 28 provides preset external device information corresponding to the changeover area in which a pointer is indicated to the main computer 10 through the Bluetooth communication 2b.

As shown in FIG. 4, the first controller 28 presets the first changeover area 4a, the second changeover area 4b and the third changeover area 4c on the overall indication area of the first display unit 27. The first changeover area 4a is set up to correspond to the main computer 10, the second changeover area 4b is set up to correspond to the second external device 30, and the third changeover area 4c is set up to correspond to the third external device 40. The first controller 28 determines whether the pointer 17a, according to the second radio signal, points to any one changeover area over a designated time, and provides external device information corresponding to the changeover area to which the pointer 17a points for the predetermined time for the main computer 10 through the Bluetooth communication 2b.

The second external device 30 is connected with the main computer 10, having undergone the initial recognition and installation processes through the Bluetooth communication 2c. The second external device 30 includes a second display unit 37, a second Bluetooth module 35, which is a wireless communications module to interface with an external device, and a second controller 38 to communicate with the external device connected through the second Bluetooth module 35. Of course, the second Bluetooth module 35 includes a HID profile.

Where the second radio signal is input from the main computer 10 through the Bluetooth communication 2c, the second external device 30 performs operations in which a pointer of the second external device is moved, a menu screen is indicated, or a screen is changed on the screen of the second display unit 37 according to the second radio signal. Here, according to the second radio signal, the second controller 38 grasps a display position of a pointer indicated on the second display unit 37.

In the meantime, the second controller 38 sets up at least one changeover area in the overall indication area of the second display unit 37, and presets the external device information on the main computer 10 and the external devices 20 and 40. Thus, the second controller 38 determines whether a pointer indicated according to the second radio signal points to a predetermined changeover area of the second display unit 37 for a predetermined time. When it is determined that the pointer points to a predetermined changeover area of the second display unit 37 for the predetermined time, the second controller 38 provides the preset external device information corresponding to the changeover area in which a pointer is indicated, to the main computer 10 through the Bluetooth communication 2c.

The third external device 40 is connected with the main computer 10 after having undergone the initial recognition and installation processes through the Bluetooth communications 2d. The third external device 40 includes a third display unit 47, a third Bluetooth module 45, which is a wireless communications module to interface with an external device, and a third controller 48 to communicate with the external device connected through the third Bluetooth module 45. Of course, the third Bluetooth module 45 includes a HID profile.

Where the second radio signal is input from the main computer 10 through the Bluetooth communications 2d, the third external device 40 performs operations that a pointer is moved, a menu screen is indicated, or a screen is changed over, on the screen of the third display unit 47 according to the second radio signal. Here, according to the second radio signal, the third controller 48 grasps a display position of a pointer in the process of processing the pointer in order to be indicated on the third display unit 47.

In the meantime, the third controller 48 sets up at least one changeover area in the overall indication area of the third display unit 47, and presets the external device information on the main computer 10 and the external devices 20 and 30. Thus, the third controller 48 determines whether the pointer, indicated according to the second radio signal, points to a predetermined changeover area of the third display unit 47 for a predetermined time. When it is determined that the pointer points to the predetermined changeover area of the third display unit 47 for the predetermined time, the third controller 48 provides the preset external device information corresponding to the changeover area in which a pointer is indicated to the main computer 10 through the Bluetooth communication 2d.

Thus, the external devices 20, 30, and 40 receive the second radio signal having the same data information such as pointing information and click information as that of the first radio signal provided from the mouse 50 from the main computer 10. Further, the external devices 20, 30, and 40 perform operations according to the received second radio signal. That is, the external devices 20, 30, and 40 respond to the mouse 50 as though they were communicating with the mouse 50 on a one-to-one basis, respectively.

That is, when an changeover event for using the mouse 50 in the external devices 20, 30, and 40 connected to the main computer 10 is input through manipulation of the mouse 50 of a user, the computer system uses the mouse 50 as an input to control the external devices 20, 30, and 40, using an HID profile 11 of the Bluetooth module 14.

Here, the MICOM 18 of the main computer 10 determines whether the external device information is input from the one of the external devices 20, 30, and 40 that receives the second radio signal. Where the external device information is input, the MICOM 18 controls the Bluetooth module 14 to convert the first radio signal input from the mouse 10 into the second radio signal to be processed in the external device corresponding to the external device information. That is, for example, when the external device information is input from the first external device 20 while the main computer 10 provides the second radio signal to the first external device 20, the MICOM 18 grasps the type of the external device corresponding to the changeover area to which the pointer points on the first display unit 27 of the external device 20 for a predetermined time based on the external device information. Thus, when the corresponding external device is determined to be the second external device 30 based on the inputted external device information, the MICOM 18 controls the controller 13 of the Bluetooth module 14, to convert the first radio signal from the mouse 50 into the second radio signal to be provided to the second external device 30. That is, when a changeover event for using the mouse 50 in external devices 20, 30, and 40 connected to the main computer 10 is input through manipulation of the mouse 50 of a user, the mouse 50 may be used as an input to control the external devices 20, 30, and 40, using the HID profile 11 of the Bluetooth module 14 under the control of the MICOM 18.

When the MICOM 18 determines that the corresponding external device based on the input external device information is the main computer 10 itself, the MICOM 18 controls the Bluetooth module 14, the input/output processing unit 15 and the video signal processing unit 16 to process the first radio signal from the mouse 50 to control pointer movement, and to control a menu display according to the processed result. That is, when a changeover event using the mouse 50 in the main computer 10 is input through a manipulation of the mouse 50, the first radio signal input from the mouse 50 may be used as an input to control the main computer 10 under the control of the Bluetooth module 14 by the MICOM 18.

Figure 5:
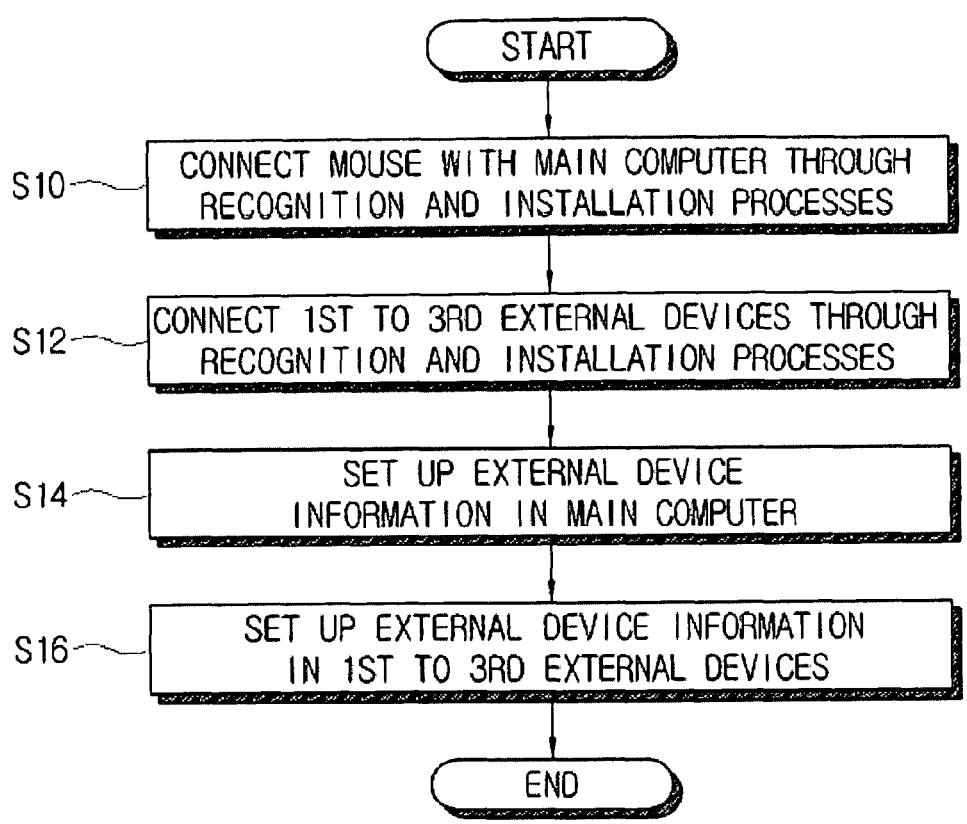
FIG. 5 is a flowchart for explaining that respective components in the computer system according to an example embodiment of the present invention are connected through Bluetooth communications.
Figure 6:
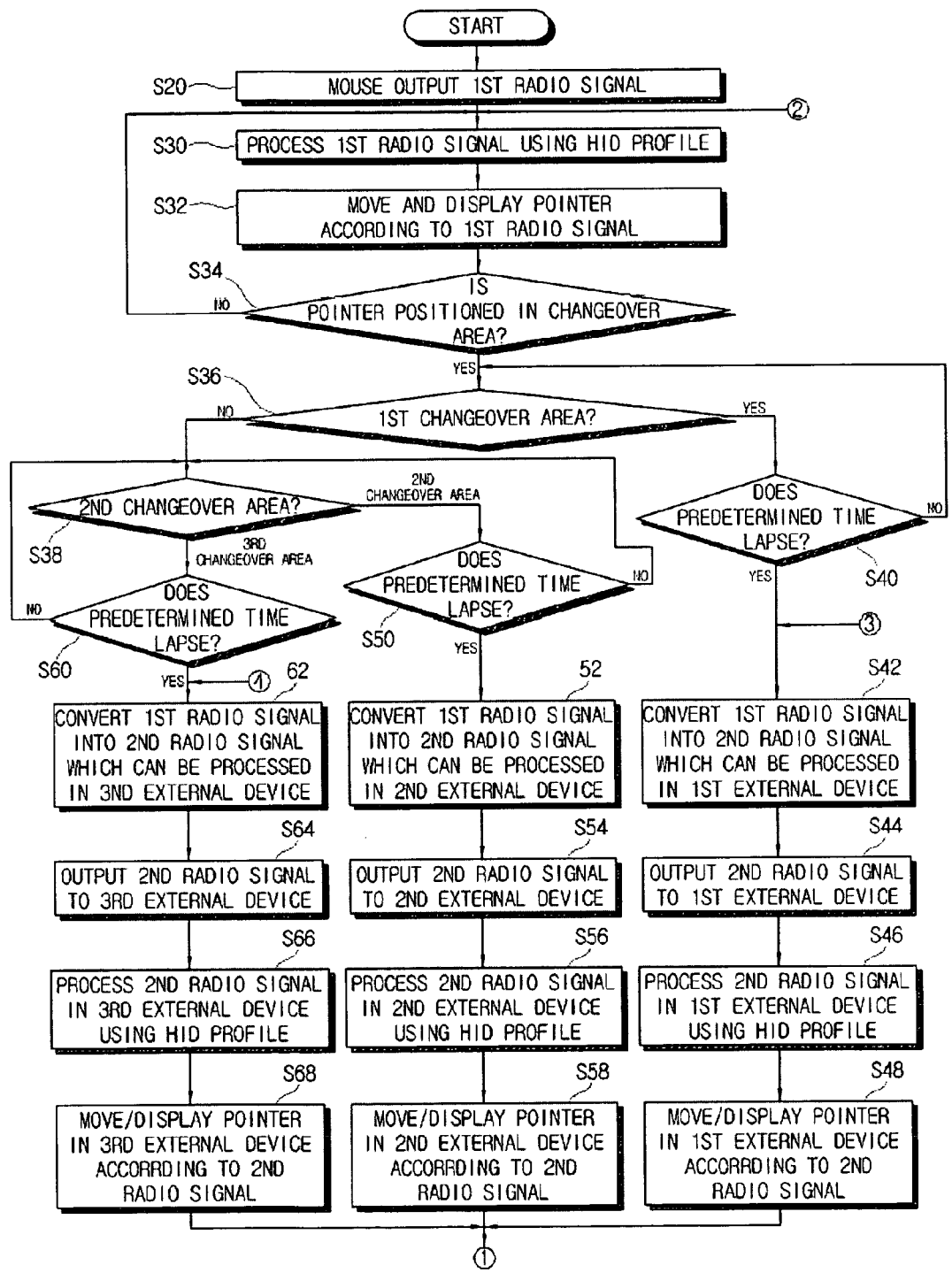
FIGS. 6 and 7 are control flowcharts for explaining an operation of a computer system according to an example embodiment of the present invention.
Figure 7:
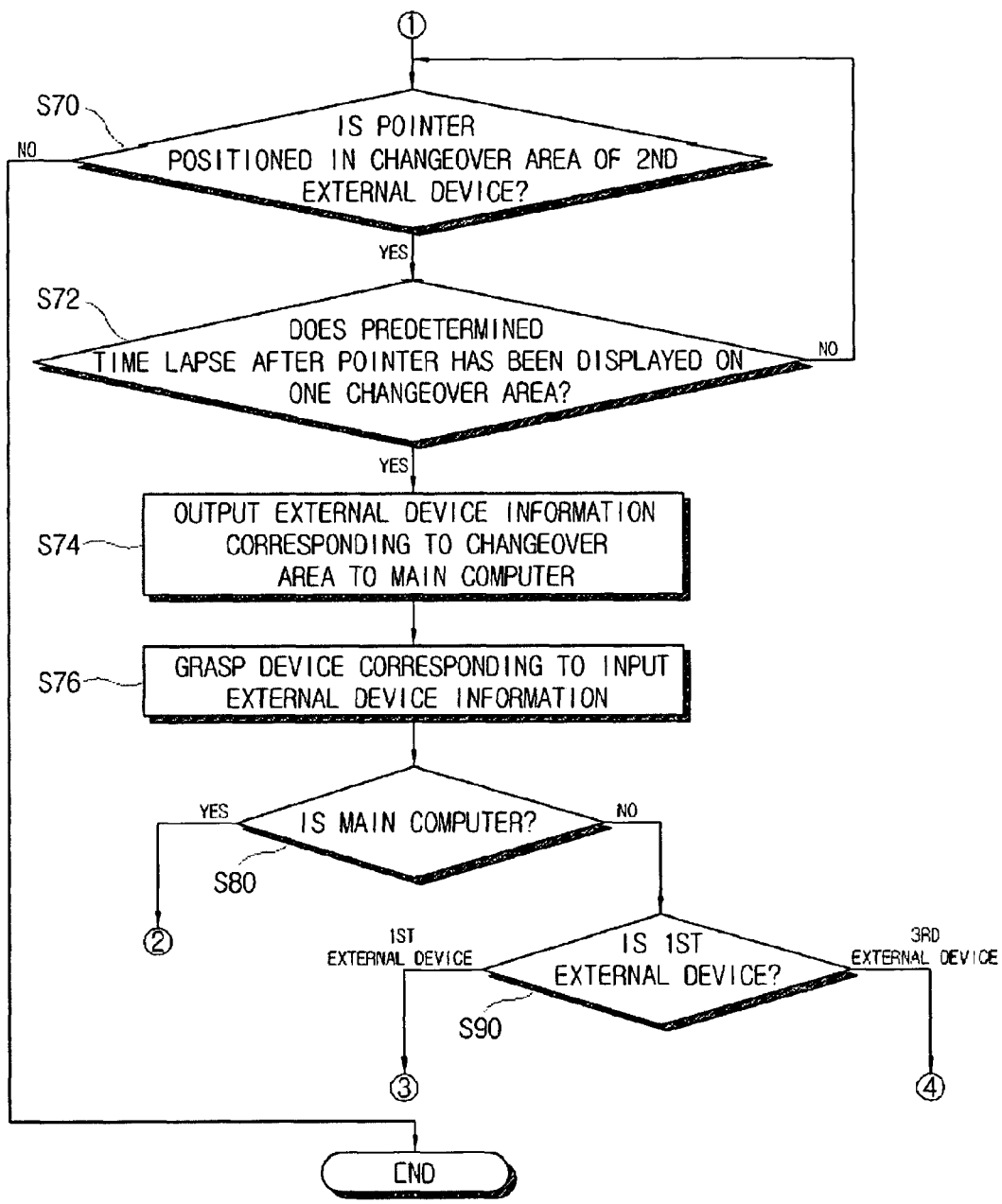

With reference to FIGS. 5 through 7, a control flow between the mouse 50 and one of the main computer 10 or any of the external devices 20, 30, and 40 through the Bluetooth communications 2a, 2b, 2c, or 2d and a control flow that changes the input of the mouse 50 will be described.

First, the mouse 50 is connected with the main computer 10 through the Bluetooth communication 2a by a performance of the conventional recognition and installation processes (S10). Also, additional conventional recognition and installation processes are performed to connect the main computer 10 with the external devices 20, 30, and 40, through the Bluetooth communications 2b, 2c, and 2d, respectively (S20). The main computer 10 sets up at least one changeover area in the overall indication area of the display unit 17 of the main computer 10, and presets the external device information on the external devices 20, 30, and 40 which correspond to each changeover area while being connected through the Bluetooth communications 2b, 2c, and 2d, respectively (S14). Moreover, each external device 20, 30, or 40 sets up at least one changeover area in the overall indication area of its own display unit, and presets up the external device information for the main computer 10 and the other external devices corresponding to each changeover area (S16).

At the state that the mouse 50 is connected with one of the main computer 10 and the external devices 20, 30, and 40 through the Bluetooth communications, a control flow changing over the input of the mouse 50 will be described in detail in the computer system, referring to FIGS. 6 and 7.

First, the mouse 50 outputs a first radio signal according to a manipulation of a user (S20). The MICOM 18 controls the HID profile 11 of the Bluetooth module 14 so that the first radio signal input from the mouse 50 through the Bluetooth communication 2a may be processed by the pointing processing unit 19 (S30). Thus, in order to perform a control action such as pointer movement and a menu display according to the first radio signal, the MICOM 18 controls the pointing processing unit 19 (S32). Thus, according to the manipulation of the mouse 50, the indicated pointer moves, and a menu is indicated or a screen is changed on the display unit 17 of the main computer 10.

Here, the MICOM 18 sets the plurality of the changeover areas on the display unit 17, and presets the external device information on external devices 20, 30, and 40 which correspond to each changeover area while being connected through Bluetooth communications 2b, 2c, and 2d, respectively. Also, the MICOM 18 determines whether the pointer points to one of the changeover areas (S34). Where the pointer points to one of the changeover areas, the MICOM 18 determines whether the pointer points to the first changeover area 4a of the display unit 17 (S36).

When the pointer points to the first changeover area 4a, the MICOM 18 determines whether the pointer points to the first changeover area 4a for the predetermined time (e.g., the five seconds) (S40). Where the MICOM 18 determines that the pointer points to the first changeover area 4a for the predetermined time, the MICOM 18 controls the Bluetooth module 14 to convert the first radio signal input from the mouse 5 into the second radio signal to be provided to the first external device 20 (S42). Thus, the second radio signal is output from the main computer 10 to the first external device 20 (S44). The first external device 20 processes the input second radio signal to be used in the first external device 20, using the HID profile of the first Bluetooth module 25 (S46). Thus, the first external device 20 performs a control action such as pointer movement and a menu display (S48).

Where the pointer does not point to the first changeover area 4a, in operation S36, the MICOM 18 determines whether the pointer points to the second changeover area 4b of the display unit 17 (S38). When the pointer points to the second changeover area 4b, the MICOM 18 determines whether the pointer points to the second changeover area 4b for the predetermined time (S50). Where the pointer points to the second changeover area 4b for the predetermined time, the MICOM 18 controls the Bluetooth module 14 to convert the first radio signal into the second radio signal to be provided to the second external device 30 (S52). Thus, the second radio signal is output from the main computer 10 to the second external device 30 (S54). The second external device 30 processes the input second radio signal to be used in the second external device 30, using the HID profile of the second Bluetooth module 35 (S56). Thus, the second external device 30 performs a control action such as pointer movement and a menu display (S58).

Where the pointer does not point to the second changeover area 4b, in operation S38, the MICOM 18 determines whether the pointer points to the third changeover area 4c. When the pointer points to the third changeover area 4c, the MICOM 18 determines whether the pointer points to the third changeover area 4c for the predetermined time (S60). Where the pointer is determined to point to the third changeover area 4c for the predetermined time, the MICOM 18 controls the Bluetooth module 14 in order to convert the first radio signal input from the mouse 50 into the second radio signal to be provided to the third external device 40 (S62). Thus, the second radio signal is output from the main computer 10 to the third external device 40 (S64). The third external device 40 uses the HID profile of the third Bluetooth module 45, and processes the input second radio signal to be used in the third external device 40 (S66). Thus, the third external device 40 performs a control action such as pointer movement and a menu display (S68).

Thus, each external device 20, 30, or 40 may receive the second radio signal having the same data information such as pointing and clicking information as that of the first radio signal provided from the mouse 50 from the main computer 10 and perform operations according to the second radio signal. That is, although an operation according to the second radio signal provided from the main computer 10 is performed, the external devices 20, 30, and 40 are affected the same way as if they were communicating directly with the mouse 50.

As an example, assuming a state in which an input of the mouse 50 is used to control the second external device 30, the first radio signal from the mouse 50 is transformed to the second radio signal through the main computer 10 and is provided to the second external device 30.

The second controller 35 of the second external device 30 sets up a plurality of changeover areas on the second display unit 37, and presets the external device information on the main computer 10 and the other external devices 20 and 40. While the second external device 30 performs a control action such as pointer movement and a menu display according to the second radio signal by performing the above-described operations S56 and S58 of FIG. 6, the second controller 38 determines whether the pointer, according to the second radio signal, points to one of the changeover areas (S70). Where the pointer points to one of the changeover areas, the second controller 38 determines the pointer points to the one changeover area for the predetermined time (S72). Where the pointer points to the one changeover area over the predetermined time, the second controller 38 outputs the preset external device information corresponding to the changeover area to the main computer 10 through the Bluetooth communication 2c (S74).

Thus, where that the external device information is input, the MICOM 18 of the main computer 10 grasps the corresponding external device based on the input external device information (S76). That is, the MICOM 18 determines whether the corresponding external device based on the input external device information is the main computer 10 (S80). Where the corresponding external device is the main computer 10, the MICOM 18 conducts operation S30 to process the first radio signal from the mouse 50 and to perform a control action including pointer movement and a menu display according to the processed first radio signal. Here, in the decision result of operation S80, the MICOM 18 determines whether the corresponding external device is a first external device where the external device based on the external device information is not the main computer 10 (S90). Where the corresponding external device based on the external device information is the first external device 20, the MICOM 18 conducts operation S42 to control the Bluetooth module 14 to convert the first radio signal input from the mouse 10 into the second radio signal to be processed in the first external device 20. Moreover, in the operation S90 decision result, where the corresponding external device based on the external device information is the third external device 40, the MICOM 18 conducts operation S62 to control the Bluetooth module 14 to convert the first radio signal input from the mouse 10 into the second radio signal to be processed in the third external device 40.

As is described above, according to aspects of the present invention, when the mouse 50, which is the HID, is connected with the main computer 10 through Bluetooth communication, and where several external devices 20, 30, and 40 are connected with the main computer 10 through the Bluetooth communications 2a, 2b, and 2c, the input of the mouse 50 may be used in the main computer 10 or one of the external devices 20, 30, and 40 according to manipulation of the mouse 50. Therefore, according to aspects of the present invention, when a plurality of devices 10, 20, 30, and 40 are controlled using one mouse 50, the desired devices can be conveniently changed over without having to repetitively perform the recognition and installation processes.

As described above, according to aspects of the present invention, the computer system and the control method which controls a plurality of devices with a single external input device without having to repetitively set up external input devices.

While there have been illustrated and described what are considered to be example embodiments of the present invention, it will be understood by those skilled in the art, and as technology develops, that various changes and modifications may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A computer system comprising:
   a host computer comprising a display unit comprising a display area;
   at least one external device for interfacing with the host computer, the at least one external device each comprising a display unit comprising a display area;
   a wireless communications module to interface with the external device;
   a pointing processing unit to move a pointer indicated on the display unit in accordance with a first radio signal input via the wireless communications module; and
   a controller arranged to control the wireless communications module to output a second radio signal, which corresponds to the first radio signal, to the external device, if the pointer remains in a changeover area of the display area on the display unit for a predetermined time, the second radio signal controlling a second pointer on the display area of the display unit of the external device,
   wherein the at least one external device each provides at least one changeover area corresponding to the host computer or another external device,
   wherein the first radio signal controls the pointer or the second pointer but not both at a same time,
   wherein the at least one external device each provides preset external device information to the host computer corresponding to the changeover area corresponding to the respective external device, the external device information comprising a type of the device and an address of the device, and
   wherein the at least one external device each provides to the host computer information of a type and address of the host computer or the another external device corresponding to the at least one changeover area.

2. The computer system according to claim 1, wherein the controller determines a display position of the pointer so as to determine whether the pointer is in the changeover area.

3. The computer system according to claim 2, wherein the controller associates the changeover area with the external device so as to control the external device when the pointer remains in the changeover area for the predetermined time.

4. The computer system according to claim 3, wherein the wireless communications module comprises a Bluetooth module having a Human Interface Device (HID) profile.

5. The computer system according to claim 4, wherein the controller controls the wireless communications module to convert data of the first radio signal into the second radio signal corresponding to the changeover area, and to output the converted result to the external device, when the pointer remains in the changeover area for the predetermined time.

6. The computer system according to claim 5, wherein the wireless communications module converts data of the first radio signal using the HID profile.

7. The computer system according to claim 6, further comprising a first external device and at least one second external device, which interface with the host computer through the wireless communications module, respectively.

8. The computer system according to claim 7, wherein the changeover area comprises a first changeover area and at least one second changeover area, the controller setting the first changeover area to correspond to the first external device and the second changeover area to correspond to the at least one second external device.

9. The computer system according to claim 8,
wherein the first external device and the at least one second external device each comprise displays on which pointers point,
wherein the first external device and the at least one second external device each cause pointers to move according to the second radio signal when the second radio signal is input from the host computer.

10. The computer system according to claim 9,
wherein the controller controls the wireless communications module to convert data of the first radio signal into the second radio signal, which can be processed in the external device corresponding to the external device information, and to output the converted result,
where the external device information is input from one external device during the outputting of the second radio signal through the wireless communications module to any one of the first external device and the at least one second external device.

11. The computer system according to claim 10,
wherein the controller determines whether the external device information input from any of the external devices is information on the host computer, and
when the external device information is the information on the host computer, controls the wireless communications module and the pointing processing unit to cause the pointer of the host computer to move in correspondence to the first radio signal.

12. The computer system according to claim 1, wherein the display unit, the wireless communications module, the pointing processing unit and the controller are provided in the host computer.

13. The computer system according to claim 12, further comprising an external input device to output the first radio signal to the host computer.

14. The computer system according to claim 13, wherein the controller recognizes a position of the pointer on the display area.

15. The computer system according to claim 14, wherein the controller sets up at least one changeover area in the display area, and presets external device information on an external device corresponding to each changeover area.

16. The computer system according to claim 15, wherein the wireless communications module comprises a Bluetooth module having a Human Interface Device (HID) profile.

17. The computer system according to claim 16, wherein the controller controls the wireless communications module to convert data of the first radio signal into the second radio signal corresponding to the changeover area, and to output the converted result to the external device, when the pointer remains in the changeover area of the external device for a predetermined time.

18. The computer system according to claim 17, wherein the wireless communications module converts data of the first radio signal using the HID profile.

19. The computer system according to claim 18, further comprising a first external device and at least one second external device, which interface with the computer through the wireless communications module, respectively.

20. The computer system according to claim 19,
wherein the changeover area comprises a first changeover area and at least one second changeover area,
the controller setting the first changeover area to correspond to the first external device and the second changeover area to correspond to the at least one second external device.

21. The computer system according to claim 20,
wherein the first external device and the at least one second external device each comprise displays on which pointers point,
wherein the first external device and the at least one second external device each cause pointers to move according to the second radio signal where the second radio signal is input from the computer.

22. The computer system according to claim 21, wherein the controller controls the wireless communications module to convert data of the first radio signal into the second radio signal, which can be processed in the external device corresponding to the external device information, and to output the converted result, when the external device information is input from one external device during the outputting of the second radio signal through the wireless communications module to any one of the first external device and the at least one second external device.

23. The computer system according to claim 22,
wherein the controller determines whether the external device information input from any of the external devices is information on the computer, and
when the external device information is the information on the computer, the controller controls the wireless communications module and the pointing processing unit to cause the pointer of the computer to move in correspondence to the first radio signal.

24. A control method of a computer system including a host computer comprising a display unit comprising a display area and a wireless communications module to interface with at least one external device, the at least one external device each comprising a display unit comprising a display area, and an external input device, the control method comprising:
  causing the external input device to output a first radio signal;
  causing a pointer indicated on a display area of the host computer move in correspondence to the first radio signal;
  determining whether the pointer remains in a changeover area, corresponding to the external device, on the display area for a predetermined time; and
  if the pointer remains in the changeover area for the predetermined time, causing the host computer to output a second radio signal corresponding to the first radio signal to the external device, the second radio signal controlling a second pointer on the display area of the display unit of the external device, wherein the first radio signal controls the pointer or the second pointer but not both at a same time, wherein the at least one external device each provides at least one changeover area corresponding to the host computer or another external device, wherein the at least one external device each provides preset external device information to the host computer corresponding to the changeover area corresponding to the respective external device, the external device information comprising a type of the device and an address of the device, and wherein the at least one external device each provides to the host computer information of a type and address of the host computer or the another external device corresponding to the at least one changeover area.

25. The control method of a computer system according to claim 24, further comprising setting up the changeover area to correspond to the external device.

26. The control method of a computer system according to claim 25, wherein the outputting of the second radio signal comprises:
  converting data of the first radio signal into the second radio signal; and
  outputting the converted result to the external device.

27. The control method of a computer system according to claim 26, further comprising setting up a first external device and at least one second external device to interface with the computer through the wireless communications module.

28. The control method of a computer system according to claim 27, further comprising causing the computer to preset the external device information comprising setting up a first changeover area on the display area to correspond to the first external device and a second changeover area on the display area to correspond to the at least one second external device.

29. The control method of a computer system according to claim 28, wherein the first external device and the at least one second external device each:
  determine whether the second radio signal is input; and
  cause the pointer indicated on the display areas of the respective display units to move according to the second radio signal.

30. The control method of a computer system according to claim 29, wherein the computer determines whether the external device information is input; and converts data of the first radio signal into the second radio signal.

31. The control method of a computer system according to claim 30, wherein the computer causes the pointer indicated on the display area of the computer to move in correspondence to the first radio signal input.

32. A system comprising:
  a main computer comprising a display unit to display a first display area;
  an input device wirelessly connected to the main computer to control a pointer displayed on the first display area via a first signal; and
  at least one external device comprising a display unit to display a second display area, wirelessly connected to the main computer,
  wherein the main computer presets a changeover area on the first display area such that, if the input device controls the pointer to remain in the changeover area for a predetermined time, the main computer converts the first signal into a second signal to be recognized by the external device such that the input device then controls a second pointer displayed on the second display area,
  wherein the at least one external device each provides at least one changeover area corresponding to the main computer or another external device,
  wherein the first radio signal controls the pointer or the second pointer but not both at a same time,
  wherein the at least one external device each provides preset external device information to the main computer corresponding to the changeover area corresponding to the respective external device, the external device information comprising a type of the device and an address of the device, and
  wherein the at least one external device each provides to the main computer information of a type and address of the host computer or the another external device corresponding to the at least one changeover area.

33. The system according to claim 32, further comprising a second external device wirelessly connected to the main computer comprising a display unit to display a third display area.

34. The system according to claim 33, wherein the main computer presets a second changeover area of the first display area such that, when the input device controls the pointer to remain in the second changeover area for the predetermined time, the main computer converts the first signal into a third signal to be recognized by the second external device such that the input device then controls a pointer displayed on the third display area.

35. The system according to claim 34, wherein the external device and the second external device each comprise computers to respectively preset third and fourth changeover areas on the respective display areas such that:
  when the input device controls the pointer displayed on the second display area, and when the pointer remains in the third changeover area, the main computer converts the second signal into the third signal, and
  when the input device controls the pointer displayed on the third display area, and when the pointer remains in the fourth changeover area, the main computer converts the third signal into the second signal.

* * * * *